D. FIGGE.
Horse Hay Fork.
No. 57,110.
Patented Aug. 14, 1866.
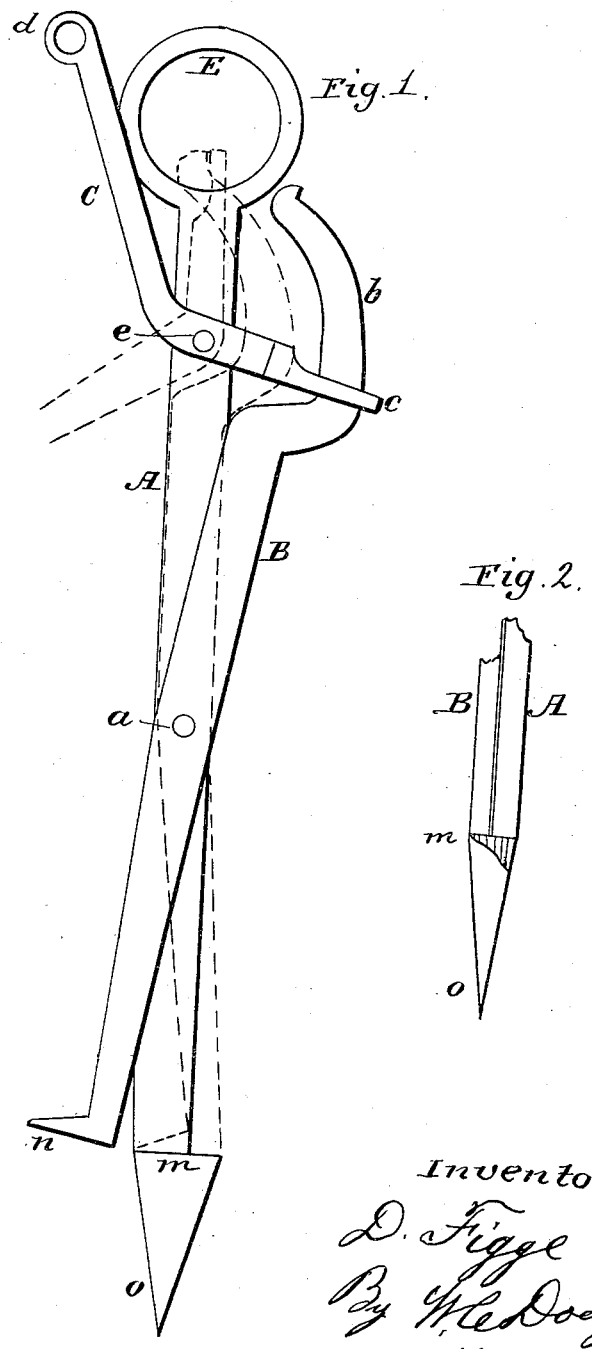

UNITED STATES PATENT OFFICE.

DANIEL FIGGE, OF JENNER'S CROSS-ROADS, PENNSYLVANIA.

IMPROVEMENT IN HORSE HAY-FORKS.

Specification forming part of Letters Patent No. 57,110, dated August 14, 1866.

*To all whom it may concern:*

Be it known that I, DANIEL FIGGE, of Jenner's Cross-Roads, in the county of Somerset and State of Pennsylvania, have invented certain new and useful Improvements in Hay-Elevators; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

Figure 1 is a side elevation, and Fig. 2 an edge view of a portion.

My invention relates to that class of implements designed for lifting large quantities of hay or similar material to place it on vehicles, stacks, or in barns; and it consists in a pair of pivoted bars so arranged that they can be thrust into the mass to be lifted, and then so opened as to cause them to hold the same securely while being raised, and release the same when closed.

A represents a straight iron bar having an eye or ring, E, at its upper end to secure it to a rope. At its lower end it is provided with an enlargement having a shoulder, m, projecting at right angles from two sides, as shown in Figs. 1 and 2. Another bar, B, is pivoted at a to the bar A, as shown in Fig. 1, this bar B being provided at its lower end with a hook, n, projecting therefrom, as shown in Fig. 1. This bar is shorter than A, so that when moved back or shut together, as shown in red, the hook n will occupy the space or recess immediately above the shoulder of m, the hook n being equal in length to the width of m, and their sides being flush, as shown in Fig. 2.

The upper end, b, of the bar B is curved, as shown, and is inclosed by the end c of an elbow-lever, C, pivoted at e to the bar A, as shown in Fig. 1, the opposite end of the lever C being provided with an eye, d, for attaching a cord thereto. When the elbow-lever C is raised, as shown in Fig. 1, the upper end, b, of the bar B is thrown back, thereby causing the lower end, with its hook n, to be thrown out to the opposite side, as shown. When, however, the lever C is drawn down, as shown in red, the bar B is thrown back, thus bringing the hook n back over the projecting shoulder m.

The lower end of the enlargement m is pointed, as shown at o, and when the two bars are thus closed together the pointed end is thrust into the mass of hay or other material to be raised. The lever C being then raised, as shown in Fig. 1, opens the bars at their lower ends, when the material is held on one side by the projecting hook n, and on the opposite side on the projecting shoulder of m, the two parts acting like the barbs of a harpoon to hold the material while being lifted to its desired position.

It will, of course, be understood that the implement may be attached to any desired or suitable hoisting apparatus, and that a separate cord or handle will be arranged for operating the lever C at the proper time.

By this means I am enabled to construct a very strong, cheap, and efficient apparatus for elevating hay or any similar material with ease and rapidity.

Having thus described my invention, what I claim is—

The bars A and B, constructed as shown and described, and arranged to operate in combination with the lever C, as and for the purpose set forth.

DANIEL FIGGE.

Witnesses:
A. W. WAKEFIELD,
THOMAS GALLAGHER.